United States Patent
Willems et al.

(10) Patent No.: US 6,923,003 B2
(45) Date of Patent: Aug. 2, 2005

(54) POWER GENERATING APPARATUS HAVING COMBUSTION TURBINE INLET AIR FLOW TEMPERATURE SENSOR FOR SENSING A DRYBULB TEMPERATURE AND RELATED METHODS

(75) Inventors: Daniel E. Willems, Oviedo, FL (US); Weston G. Frost, Winter Springs, FL (US)

(73) Assignee: Siemens Westinghouse Power Corporation, Orlando, FL (US)

(*) Notice: Subject to any disclaimer, the term of this patent is extended or adjusted under 35 U.S.C. 154(b) by 0 days.

(21) Appl. No.: 10/430,663

(22) Filed: May 6, 2003

(65) Prior Publication Data

US 2004/0050069 A1 Mar. 18, 2004

Related U.S. Application Data

(63) Continuation-in-part of application No. 10/244,066, filed on Sep. 13, 2002, now Pat. No. 6,775,988.

(51) Int. Cl.$^7$ .............................. F02C 3/30; F02C 7/04
(52) U.S. Cl. ......................... 60/775; 60/39.53; 60/728; 60/39.3
(58) Field of Search ................................ 60/775, 39.53, 60/728, 39.3; 374/144, 208, 135; 136/218, 231

(56) References Cited

U.S. PATENT DOCUMENTS

| | | | | |
|---|---|---|---|---|
| 3,075,387 A | * | 1/1963 | Rademacher | 136/231 |
| 3,085,125 A | * | 4/1963 | Hill | 136/233 |
| 5,103,629 A | | 4/1992 | Mumford et al. | 60/39 |
| 5,191,767 A | * | 3/1993 | Kane et al. | 60/728 |
| 5,252,860 A | | 10/1993 | McCarty et al. | 290/40 |
| 5,353,585 A | * | 10/1994 | Munk | 60/775 |
| 5,463,873 A | * | 11/1995 | Early et al. | 62/121 |
| 5,537,813 A | * | 7/1996 | Davis et al. | 60/775 |
| 5,930,990 A | | 8/1999 | Zachary et al. | 60/39.53 |
| 6,250,064 B1 | * | 6/2001 | Tomlinson et al. | 60/775 |
| 6,260,350 B1 | * | 7/2001 | Horii et al. | 60/39.3 |
| 6,308,512 B1 | | 10/2001 | Kopko | 60/39 |
| 6,442,942 B1 | | 9/2002 | Kopko | 60/773 |
| 2001/0054354 A1 | * | 12/2001 | Baudat et al. | 95/214 |

* cited by examiner

Primary Examiner—Ted Kim (57) ABSTRACT

A power generating apparatus 20' includes an electrical generator 22' and a combustion turbine 24' for driving the electrical generator. The combustion turbine 24' may have a combustion turbine air inlet 30' for receiving an inlet air flow 25'. The power generating apparatus 20' may also include an evaporative water cooler 26' for evaporating water into the inlet air flow 25' to cool the inlet air flow, and an inlet air flow temperature sensor 28' between the evaporative water cooler and the combustion turbine air inlet 30'. The inlet air flow temperature sensor 28' may include a hollow body 32' connected in fluid communication with the inlet air flow 25', and a temperature sensing device 34' carried by the hollow body. The hollow body 32' may include interior portions to reduce water accumulation on the temperature sensing device 34' so that the temperature sensing device senses a drybulb temperature. The power generating apparatus 20' may also include a controller 47' for controlling the evaporative water cooler 26' based upon the sensed drybulb temperature to cool the inlet air flow 25' to any temperature between the sensed drybulb temperature and a saturation temperature.

39 Claims, 8 Drawing Sheets

POWER GENERATING APPARATUS HAVING COMBUSTION TURBINE INLET AIR FLOW TEMPERATURE SENSOR FOR SENSING A DRYBULB TEMPERATURE AND RELATED METHODS

RELATED APPLICATIONS

This application is a continuation-in-part of U.S. patent application Ser. No. 10/244,066, filed on Sep. 13, 2002 now U.S. Pat. No. 6,775,988, titled "Combustion Turbine Having Inlet Air Flow Temperature Sensor and Related Methods" and assigned to the assignee of the present invention, the entire disclosure of which is incorporated herein by reference.

FIELD OF THE INVENTION

The present invention relates to the field of temperature sensing, and, more particularly, to temperature sensing for combustion turbine power generators.

BACKGROUND OF THE INVENTION

An electrical power generator converts mechanical energy into electrical energy. A typical electrical power generator includes a stator and a rotor that rotates within the stator to thereby generate electricity. The rotor, in turn, is mounted to a shaft that drives the rotor. Various mechanical devices may be used to drive the shaft, such as a combustion turbine.

In a conventional configuration, the combustion turbine comprises a compressor to draw in and compress a gas, such as air, for example. The combustion turbine may also comprise a combustor or heat source that adds energy to the compressed gas, and a turbine to extract power from a resulting heated gas expansion. In an electrical generator, the extracted power is used to drive the shaft, which, as noted above, rotates the rotor within the stator to generate electricity.

The capacity of the combustion turbine may be increased if air drawn in by the compressor has a lower temperature relative to that which it will attain during combustion to drive the turbine. Accordingly, cooling the ambient, or inlet, air before it is drawn into the combustion turbine can be a cost effective way to increase the capacity of the combustion turbine. One approach to cooling the inlet air is with a direct refrigeration-cooling system in which ambient air is cooled using conventional refrigeration devices and techniques. One drawback to the direct refrigeration-cooling system, however, is parasitic power loss. This is due to the relatively large power drain needed to power a refrigerator unit. According to some estimates, the parasitic power loss may be as much as thirty percent (30%) of the increased power output of the turbine power generator.

An alternative inlet air cooling technique is provided by an evaporative cooling or fogging system. With such a system, moisture in the form of a water mist or spray is added to the inlet air. As the water evaporates, the temperature of the inlet air is lowered to a new temperature, thereby cooling the inlet air before it is drawn into the compressor of the combustion turbine. An evaporative cooling system tends to be less expensive to install and to operate as compared with other techniques and devices.

Despite the advantages of evaporative cooling, measuring inlet air temperature may be made more difficult by an evaporative cooling system, which includes dripping water on media, fogging systems, spraying, and other methods, as understood by those skilled in the art. Air inlet temperature typically has been measured in conventional combustion turbine power generators that lack an evaporative cooling system by using various temperature-sensing devices, including thermistors and thermocouples. As disclosed, for example, in U.S. Pat. No. 5,252,860 to McCarty et al. and U.S. Pat. No. 5,103,629 to Mumford et al., air temperature can be measured using a thermocouple positioned adjacent a compressor air inlet.

Similar temperature sensing devices have also been employed with combustion turbine power generators that use evaporative cooling. U.S. Pat. No. 5,930,990 to Zachary et al., for example, discloses an apparatus for adding water to a gas turbine. The water is added from a spray rack assembly comprising at least one water pipe and at least one corresponding water nozzle. The water is added through a duct that helps direct the water to a compressor inlet. Inlet air temperature is measured with a temperature sensor that, as illustrated, extends into the air flow path to which water has been added.

A problem associated with conventional temperature sensing devices when used in combustion turbine power generators that use evaporative cooling is that temperature readings may be adversely affected. More specifically, water droplets may form on an exposed temperature sensing device when water is added to the inlet air. Evaporation of the water droplets on the temperature sensing device may cause an inaccurate, lower temperature reading.

This tendency is especially problematic in combustion turbine power generators using evaporative cooling since the amount of water that should be added is a function of the temperature of the inlet air. Inaccurate temperature readings may cause an inappropriate amount of water mist to be added to the inlet air resulting in premature erosion of compressor blades.

SUMMARY OF THE INVENTION

It is therefore an object of the present invention to provide a device for more accurate, more reliable temperature sensing of the inlet air flow of a combustion turbine using evaporative cooling. It is another object of the present invention to control evaporative cooling based on a more accurate sensed temperature.

These and other objects, features, and advantages in accordance with the present invention are provided by a power generating apparatus comprising an evaporative water cooler, an inlet air flow temperature sensor for sensing drybulb temperature of inlet air flow, and a controller for controlling the evaporative water cooler based upon the sensed drybulb temperature. More particularly, the power generating apparatus may comprise an electrical generator and a combustion turbine for driving the electrical generator. The combustion turbine may have a combustion turbine air inlet for receiving an inlet air flow. The evaporative water cooler may evaporate water into the inlet air flow to cool the inlet air flow.

The inlet air flow temperature sensor may be between the evaporative water cooler and the combustion turbine air inlet. Further, the inlet air flow temperature sensor may include a hollow body connected in fluid communication with the inlet air flow, and a temperature sensing device carried by the hollow body. The hollow body may comprise interior portions defining a tortuous path of air flow therethrough to reduce water accumulation on the temperature sensing device so that the temperature sensing device senses a drybulb temperature. Accordingly, a more reliable and more accurate reading of a temperature of the inlet air flow may be obtained. The controller may control the evaporative water cooler based upon the sensed drybulb temperature.

The power generating apparatus may include a plurality of spaced-apart inlet air flow temperature sensors, and the controller may control the evaporative water cooler based upon an average of the sensed drybulb temperatures. The controller may also control the evaporative water cooler to cool the inlet air flow to a temperature within a predetermined range of a saturation temperature of the inlet air flow. Further, the controller may also control the evaporative water cooler to cool the inlet air flow to a temperature within a predetermined deadband. The electrical generator may have a base load rating, and the controller may start the evaporative water cooler to cool the inlet air flow at a fraction of the base load.

The interior portions of the hollow body may include a plurality of baffles in spaced apart relation. The plurality of baffles may be arranged on alternating sides of opposing interior surface portions of the hollow body. For example, the plurality of baffles may extend inwardly in an interdigitated fashion so that the tortuous path may have a serpentine shape.

The hollow body may comprise a tube having an inlet at a first end and an outlet at a medial portion. Accordingly, the plurality of baffles may be between the inlet and the outlet.

Various types of temperature sensing devices may be carried by the hollow body. For example, the temperature sensing device may be a resistance temperature detector.

An additional aspect of the present invention relates to a method for controlling an evaporative water cooler. The method may include positioning at least one inlet air flow temperature sensor between the evaporative water cooler and the combustion turbine air inlet for sensing a drybulb temperature. The method may also include using the sensed drybulb temperature for controlling the evaporative water cooler.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation is used to refer to like elements in alternate embodiments.

Figure 1:
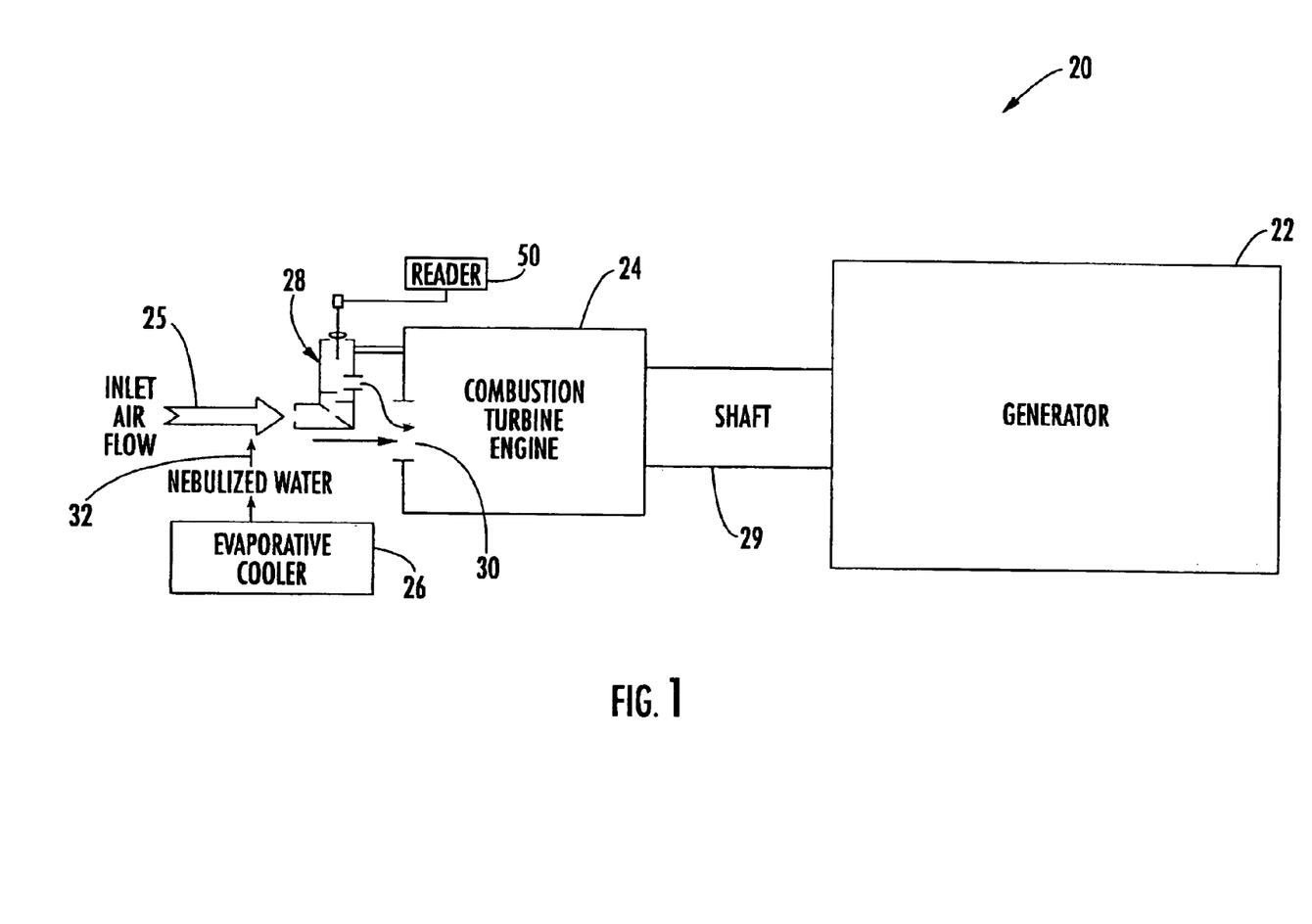
FIG. 1 is a schematic diagram of a power generating apparatus including an inlet air flow temperature sensor according to the present invention.

Referring initially to FIG. 1, a power generating apparatus 20 including an inlet air flow temperature sensor 28 in accordance with the present invention is now described. The power generating apparatus 20 illustratively includes an electrical generator 22, a combustion turbine 24 for driving the electrical generator, an evaporative water cooler 26 for cooling inlet air received by the combustion turbine, and the inlet air flow temperature sensor 28.

The combustion turbine 24, more particularly, may include a compressor for receiving and compressing an inlet air flow 25 comprising ambient air. The combustion turbine 24 may also comprise a combustor for adding fuel to the received inlet air and igniting the mixture, and a turbine that is powered by the expansion of heated gases resulting from combustion of the ignited mixture. The expansion of heated gases powers the combustion turbine 24 to drive a shaft 29 connected to the generator 22, as will be readily understood by those skilled in the art.

The electrical generator 22 may include a stator and, within the stator, a rotor driven by the shaft 29. As will also be readily understood by those skilled in the art, the turning of the rotor within the stator generates electrical power.

The combustion turbine 24 illustratively includes a combustion turbine air inlet 30 through which the inlet air flow 25 is received. The capacity of the combustion turbine 24 may be increased by lowering the temperature of the inlet air flow 25. Accordingly, the power generating apparatus 20 also illustratively includes the evaporative water cooler 26, which evaporates water 32 into the inlet air flow 25 to thereby cool the inlet air flow. As will be readily understood by those skilled in the art, water for evaporative cooling of the inlet air flow 25 may be added to the inlet air flow in nebulized form, for example, as a water spray or mist. Evaporative cooling also includes such cooling methods as an inlet fogging system, dripping water on media, spraying, and other methods, as understood by those skilled in the art. An inlet fogging system may advantageously include active controls in that the flow rate of fogged water may be increased or decreased in response to ambient conditions.

The inlet air flow temperature sensor 28 is illustratively adjacent the combustion turbine air inlet 30. The inlet air flow temperature sensor 28 provides a temperature reading of the inlet air flow 25 to which nebulized water has been added by the evaporative water cooler 26.

Figure 2:
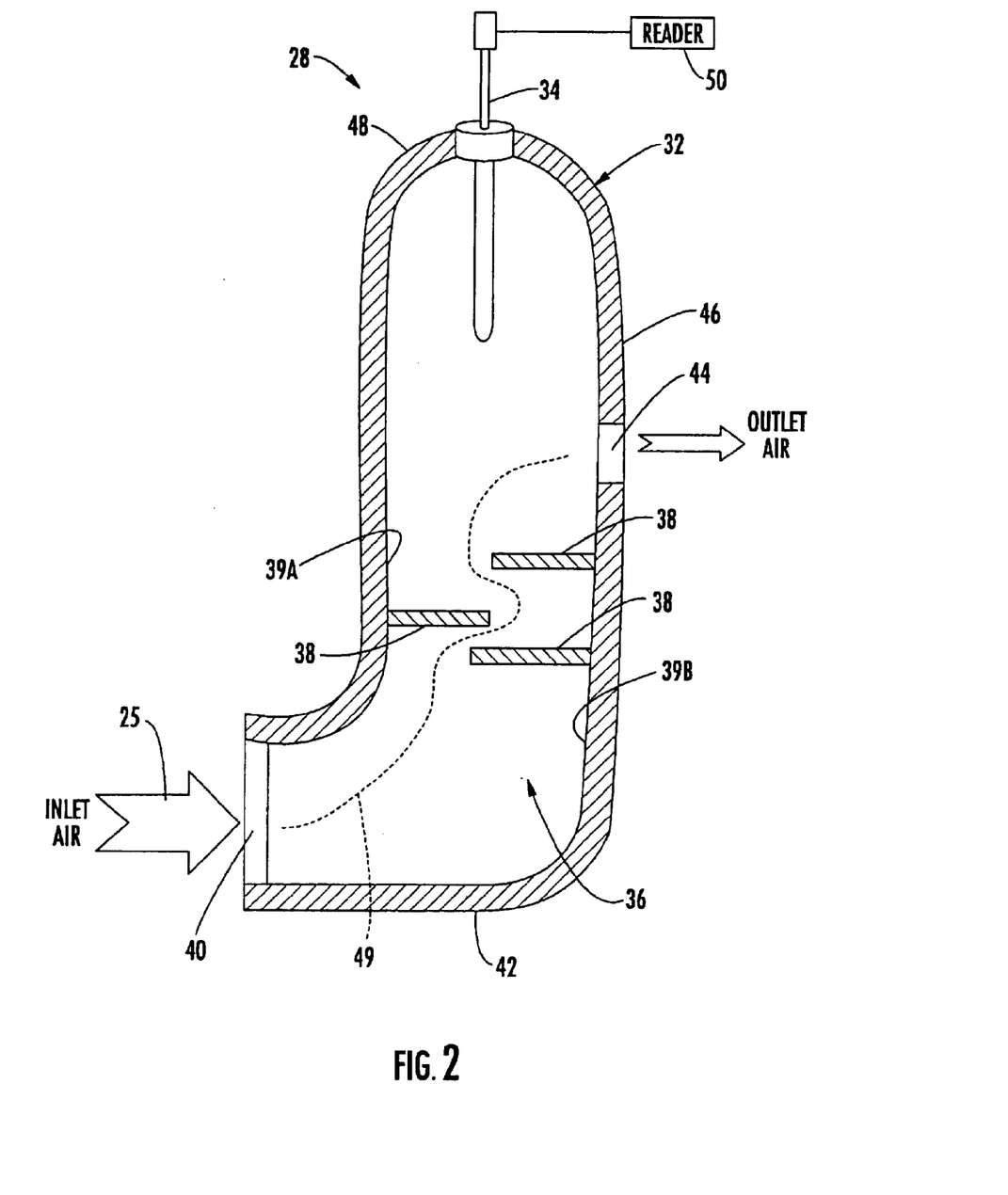
FIG. 2 is a cross-sectional view of the inlet air flow temperature sensor of the power generating apparatus in FIG. 1.

Referring additionally to FIG. 2, the inlet air flow temperature sensor 28 is now described in further detail. The inlet air flow temperature sensor 28 illustratively includes a hollow body 32, which is illustratively connected in fluid communication with the inlet air flow 25. A temperature sensing device 34 is carried by the hollow body 32 for sensing a temperature of the inlet air flow 25

Interior portions 36 of the-hollow body 32 illustratively define a tortuous path 49 of air flow through the hollow body. The tortuous path 49 advantageously reduces water accumulation on the temperature sensing device 34.

The tortuous path 49 of air flow is illustratively defined by a plurality of baffles 38. As shown, the baffles 38 are within the interior portions 36 of the hollow body 32. The baffles 38 illustratively are in a spaced-apart relation with respect to one another.

More particularly, the baffles 38 are illustratively arranged on alternating sides of opposing interior surface portions 39A, 39B of the hollow body 32. So arranged, the plurality of baffles 38 extend inwardly in an interdigitated fashion so that at least a portion of the tortuous path 49 has a serpentine shape as shown. As will be readily understood by those skilled in the art, smaller water droplets can be carried by the air flow and pass through an outlet 44, but larger ones are captured by the baffles 38 and drain out at the bottom of the hollow body 32 or re-evaporate.

The hollow body 32 illustratively comprises a tube having an inlet 40 at a first end 42 of the tube and the outlet 44 at a medial portion 46 of the tube. The plurality of baffles 38 are positioned between the inlet 40 and the outlet 44.

Although the tortuous path 49 of air flow is illustratively defined by the plurality of baffles 38, it will be apparent to those skilled in the art that a tortuous path alternately may be defined, for example, by other types of air deflectors and/or different shapes of the hollow body 32. For example, the shape of the hollow body 32 may comprise a plurality of bends or folds that similarly define a tortuous path within the interior portions 36 of the hollow body.

The temperature sensing 34 device is illustratively mounted at a second or upper end 48 of the tube. The first end of the tube 42 is illustratively arcuate. Accordingly, the tube has a generally J-shape as shown. Other shapes, however, will be readily appreciated by those skilled in the art.

The inlet 40 in the hollow body 32 is illustratively larger than the outlet 44. The relative ratio of the inlet 40 and the outlet 44 advantageously promotes the flow of air through the hollow body 32 at a rate that facilitates the sensing of the temperature of the air by the temperature sensing device 34.

The temperature sensing device 34 illustratively includes an end that extends into the path of air that flows within the hollow body 32. Accordingly, with water removed from the air as it flows along the tortuous path 49, as described above, the temperature sensed by the temperature sensing device 34 more accurately reflects the temperature of the inlet air flow 25.

The sensed temperature advantageously corresponds to a dry bulb temperature by virtue of the air having been submitted to the tortuous path 49 within the hollow body 32. The tortuous path 49, moreover, reduces the velocity of the air to thereby further improve temperature sensing by the temperature sensing device 34.

The temperature sensing device 34 illustratively comprises a resistance temperature detector. Other temperature sensing devices may also serve to sense a temperature of the air within the hollow body 32. For example, a thermocouple or thermistor may alternately be used for temperature sensing, as will be readily appreciated by those skilled in the art.

A reader 50 is illustratively connected to the temperature sensing device 34 for providing a conveniently readable indication of the sensed temperature. As will be readily understood by those skilled in the art, the reader 50 may be a simple meter, for example, or a more complex circuit, including that of a processing circuit either specifically dedicated for temperature reading or part of a general-purpose programmable computer. Moreover, as will also be readily appreciated by those skilled in the art, the reader 50 can be positioned away from both the hollow body 32 and the temperature sensing device 34 carried by the hollow body 32 so that it is easily accessible for monitoring temperatures of the inlet air flow 25 received by the combustion turbine 24.

Figure 3:
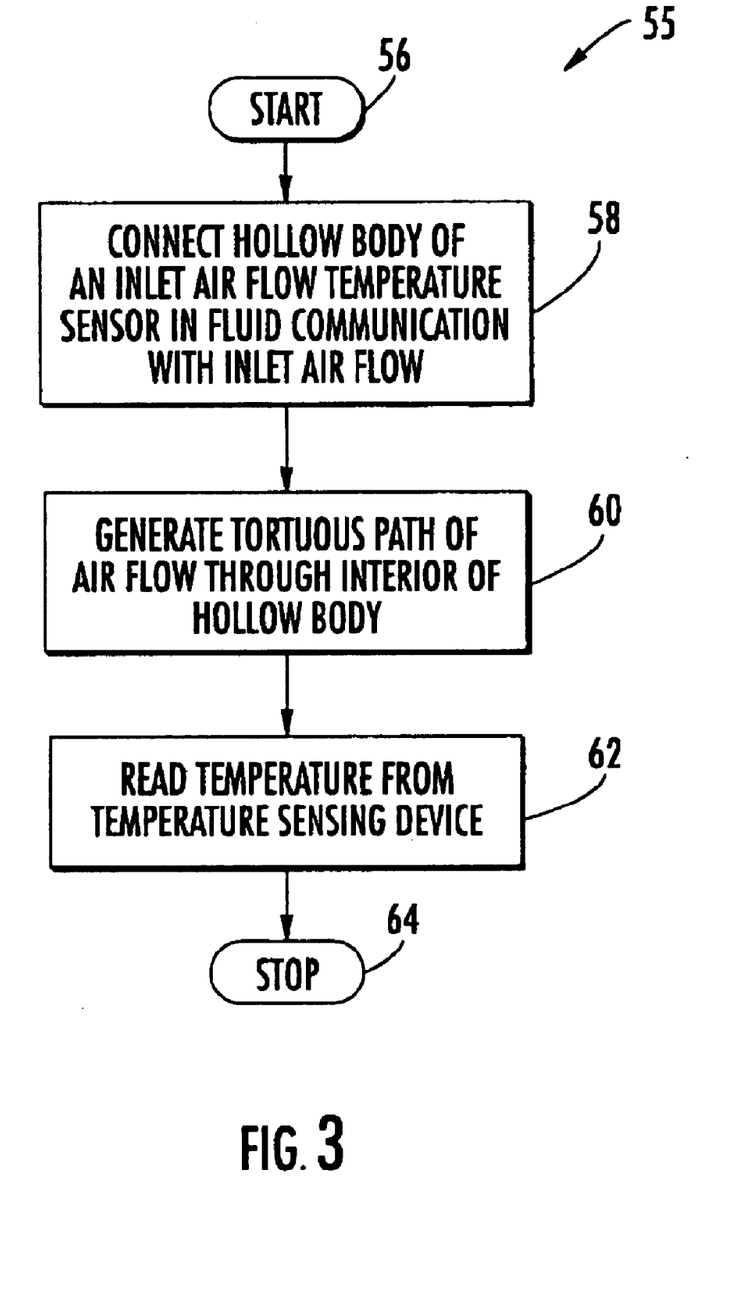
FIG. 3 is a flow chart illustrating a method for sensing inlet air flow temperature according to the present invention.

Referring additionally to the flow chart 55 of FIG. 3, a method aspect of the present invention for sensing inlet air flow temperature for an evaporatively cooled device, such as a combustion turbine 24 is now described. From the start (Block 56), a hollow body 32 of an inlet air flow temperature sensor 28 is connected in fluid communication with an inlet air flow 25 at Block 58.

At Block 60, a tortuous path 49 of air flow is generated through interior portions of the hollow body 32 so that water accumulation on the temperature sensing device 34 is reduced. Thus, the temperature sensing device 34 is advantageously able to render a more accurate reading of the inlet air flow temperature. The temperature is read at Block 62, prior to the stop at Block 64.

Figure 4:
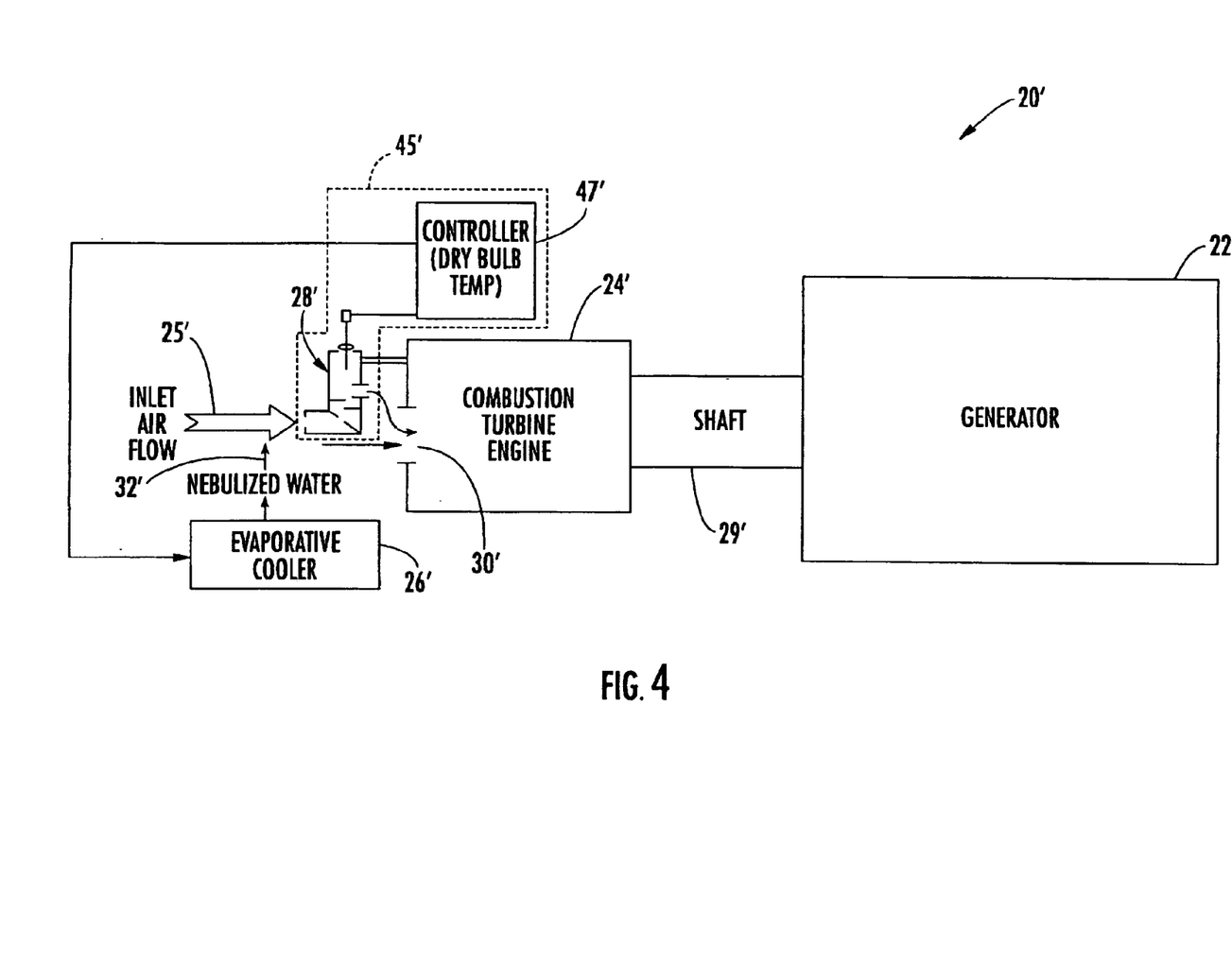
FIG. 4 is a schematic diagram of another embodiment of a power generating apparatus including a control assembly according to the present invention.

Referring additionally to FIG. 4, a second embodiment of the power generating apparatus 20' is now described. The second embodiment of the power generating apparatus 20' is similar to the embodiment of the power generating apparatus 20 described above, and includes a control assembly 45' that controls the evaporative water cooler 26' based upon a sensed drybulb temperature.

More specifically, the control assembly 45' includes a controller 47' that is illustratively connected to evaporative cooler 26'. Accordingly, the controller 47' may control the evaporative water cooler 26' based upon the sensed drybulb temperature of the inlet air flow 25'.

Figure 5:
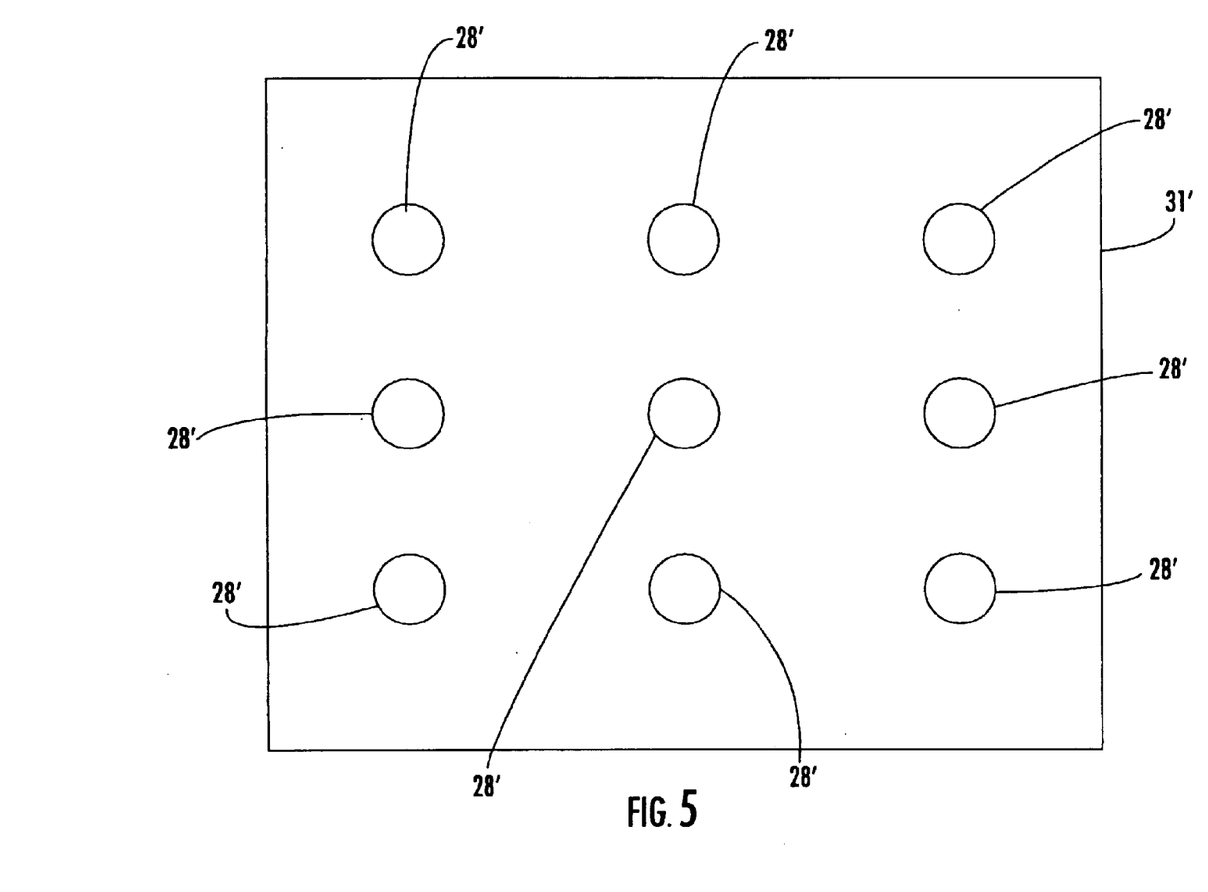
FIG. 5 is a more detailed schematic diagram of a portion of the power generating apparatus shown in FIG. 4 illustrating a plurality of spaced apart inlet air flow temperature sensors.

Referring now additionally to FIG. 5, the power generating apparatus 20' may illustratively include a plurality of spaced apart inlet air flow temperature sensors 28'. The plurality of inlet air flow temperature sensors 28' may illustratively be carried by a trash screen 31', for example. The trash screen 31' may be positioned in a path of the inlet air flow 25' to prevent trash and other debris from entering the combustion turbine air inlet 30'. The spaced apart inlet air flow temperature sensors 28' may sense a drybulb temperature of the inlet air flow 25' at different locations between the evaporative water cooler 26' and the combustion turbine air inlet 30'. Accordingly, the controller 47' may control the evaporative water cooler 26' based on an average of the sensed drybulb temperatures. This advantageously further enhances the accuracy of the measurement of temperature of the inlet air flow 25'.

The controller 47' controls the evaporative water cooler 26' within a predetermined range of a saturation temperature of the inlet air flow 25'. For example, the target temperature may be 2 degrees Fahrenheit above the saturation temperature of the inlet air flow 25' but may also be within a range of about 1 degree Fahrenheit and 0.5 degree Fahrenheit above the saturation temperature. More specifically, the controller 47' may control the temperature of the inlet air flow 25' to any point between the drybulb temperature and the saturation temperature, as understood by those skilled in the art. The temperature of the inlet air flow 25' may also be set to a predetermined deadband. The predetermined deadband may, for example, be plus 1.5 degrees Fahrenheit so that the temperature is within the range of about 2 degrees Fahrenheit and 3.5 degrees Fahrenheit above the saturation temperature of the inlet air flow 25'. Accordingly, the controller 47' may control the evaporative water cooler 26' to cool the inlet air flow 25' to a temperature within the predetermined deadband.

A typical electrical generator 22' includes a base load rating. The controller 47' may start the evaporative water cooler 26' to cool the inlet air flow 25' at a fraction of the base load. This advantageously avoids overloading of the electrical generator 22'. The other elements of the second embodiment of the power generating apparatus 22' are similar to those of the first embodiment, are labeled with prime notation, and require no further discussion herein.

Figure 6:
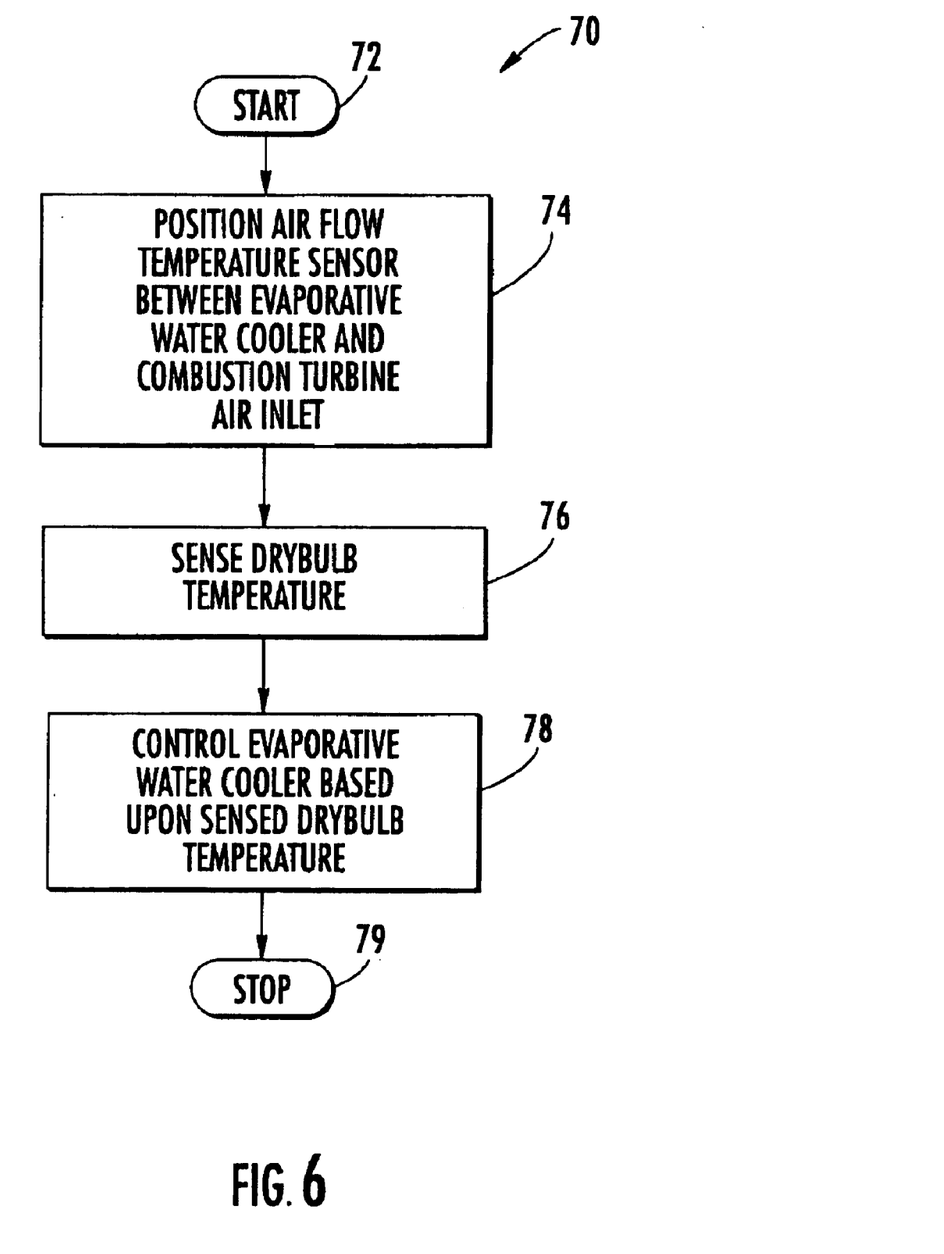
FIG. 6 is a flow chart illustrating a method for operating an evaporative water cooler according to the present invention.

Referring now additionally to the flow chart 70 of FIG. 6, a method aspect of the present invention is described. From the start (Block 72), an air flow temperature sensor 28' is positioned between the evaporative water cooler 26' and the combustion turbine air inlet 30' at Block 74. At Block 76, a drybulb temperature of the inlet air flow 25' is sensed by the air flow temperature sensor 28'. The evaporative water cooler 26' is controlled based upon the sensed drybulb temperature of the inlet air flow 25' at Block 78, prior to the stop at Block 79.

Figure 7:
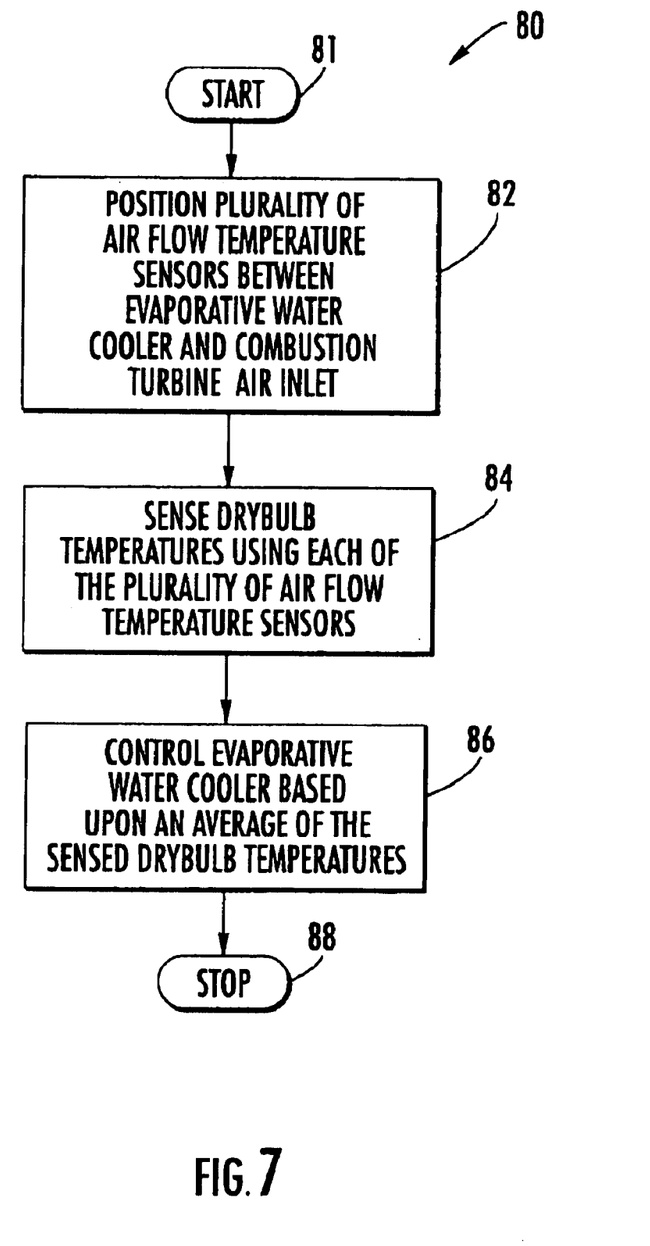
FIG. 7 is a flow chart illustrating another method for operating an evaporative water cooler according to the present invention.

Referring now additionally to the flow chart 80 of FIG. 7, another method aspect of the present invention is described. From the start (Block 81), a plurality of air flow temperature sensors 28' are positioned between the evaporative water cooler 26' and the combustion turbine air inlet 30' at Block 82. At Block 84, a drybulb temperature of the inlet air flow 25' is sensed by each of the plurality of air flow temperature sensors 28'. The evaporative water cooler 26' is controlled based upon an average of the sensed drybulb temperatures of the inlet air flow 25', prior to the stop at Block 88.

Figure 8:
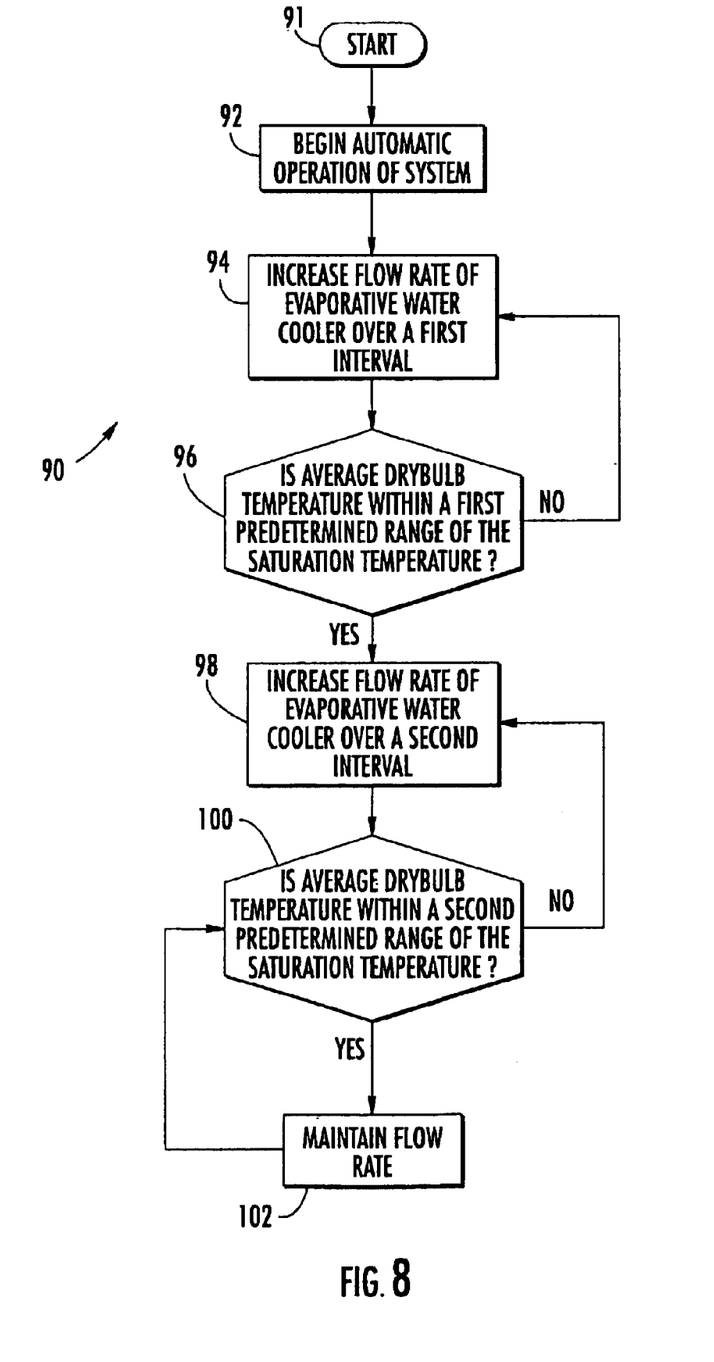
FIG. 8 is a flow chart illustrating automatic operation of the power generating apparatus illustrated in FIG. 4.

Turning now additionally to the flow chart 90 of FIG. 8, automatic operation of the power generating apparatus 22' is described. From the start (Block 91), automatic operation of the power generating apparatus 20' is started at Block 92. At Block 94, the flow rate of the evaporative water cooler 26' is increased over a first interval. More specifically, the flow rate of the evaporative water cooler 26' is preferably increased by two gallons per minute, every thirty seconds. It has been found that two gallons per minute of increased flow rate advantageously decreases the temperature of the inlet air flow 25' by approximately one degree Fahrenheit for an 820,000 cubic feet per minute (CFM) air flow. Those skilled in the art will appreciate that this flow rate may be different with various air flows.

At Block 96, it is determined whether the drybulb temperature of the inlet air flow 25' is within a first predetermined range of the saturation temperature of the inlet air flow. The first predetermined range is preferably between about 3 and 5 degrees within the saturation temperature. If it is determined that the average drybulb temperature is not within the predetermined range, then the flow rate of the evaporative water cooler 26' is again increased at Block 94. If, however, it is determined at Block 96 that the average drybulb temperature of the inlet air flow 25' is within the predetermined range, then the interval of increasing the flow rate of the evaporative water cooler 26' is decreased. More specifically, the flow rate is preferably increased by two gallons per minute every four minutes (instead of every thirty seconds as noted above). Accordingly, the temperature of the inlet air flow 25' is decreased by about one degree Fahrenheit every four minutes for an 820,000 CFM air flow.

At Block 100 it is determined whether the average drybulb temperature of the inlet air flow 25' is within a second predetermined range of the saturation temperature of the inlet air flow. The second predetermined range is preferably between about 2 and 3.5 degrees Fahrenheit within the saturation temperature. If it is determined at Block 100 that the average drybulb temperature of the inlet air flow 25' is within the second predetermined range, then the flow rate of the evaporative water cooler 26' is maintained at Block 102.

If, however, it is determined at Block 100 that the average drybulb temperature of the inlet air flow 25' is not within the second predetermined range of the saturation temperature, then the flow rate of the evaporative water cooler 26' is again increased over the second interval at Block 98.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A power generating apparatus comprising:
   an electrical generator;
   a combustion turbine for driving said electrical generator and having a combustion turbine air inlet for receiving an inlet air flow;
   an evaporative water cooler for evaporating water into the inlet air flow to cool the inlet air flow;
   a plurality of spaced-apart inlet air flow temperature sensors between said evaporative water cooler and the combustion turbine air inlet, and each of said plurality of spaced-apart inlet air flow temperature sensors comprising
      a hollow body connected in fluid communication with the inlet air flow, and
      a temperature sensing device carried by said hollow body,
      said hollow body comprising interior portions defining a tortuous path of air flow therethrough to reduce water accumulation on said temperature sensing device so that said temperature sensing device senses a drybulb temperature; and
   a controller for controlling said evaporative water cooler based upon the sensed drybulb temperatures from said plurality of spaced-apart inlet air flow temperature sensors.

2. A power generating apparatus according to claim 1 wherein said controller controls said evaporative water cooler based upon an average of the sensed drybulb temperatures.

3. A power generating apparatus according to claim 1 wherein said controller controls said evaporative water cooler to cool the inlet air flow to a temperature within a predetermined range of a saturation temperature of the inlet air flow.

4. A power generation apparatus according to claim 1 wherein said controller controls said evaporative water cooler to cool the inlet air flow to a temperature within a predetermined deadband.

5. A power generating apparatus according to claim 1 wherein said electrical generator has a base load rating; and wherein said controller starts said evaporative water cooler to cool the inlet air flow at a predetermined fraction of the base load.

6. A power generating apparatus according to claim 1 wherein the interior portions of said hollow body comprise a plurality of baffles in spaced apart relation.

7. A power generating apparatus according to claim 6 wherein said plurality of baffles are arranged on alternating sides of opposing interior surface portions of said hollow body.

8. A power generating apparatus according to claim 7 wherein said plurality of baffles extend inwardly from the opposing interior surface portions in an interdigitated fashion so that the tortuous path has a serpentine shape.

9. A power generating apparatus according to claim 8 wherein said hollow body comprises a tube having an inlet at a first end and an outlet at a medial portion; and wherein said plurality of baffles are between the inlet and the outlet.

10. A power generating apparatus according to claim 1 wherein said temperature measurement device comprises a resistance temperature detector.

11. A power generating apparatus comprising;
an electrical generator;
a combustion turbine for driving said electrical generator and having a combustion turbine air inlet for receiving an inlet air flow;
an evaporative water cooler for evaporating water into the inlet air flow to cool the inlet air flow;
at least one inlet air flow temperature sensor between said evaporative water cooler and the combustion turbine air inlet, and comprising
a tubular hollow body connected in fluid communication with the inlet air flow to intercept a portion of the inlet air flow,
a temperature sensing device carried by said tubular hollow body for sensing a drybulb temperature, and
said tubular hollow body comprising interior portions defining a tortuous path of air flow therethrough to reduce water accumulation on said temperature sensing device; and
a controller for controlling said evaporative water cooler based upon the sensed drybulb temperature.

12. A power generating apparatus according to claim 11 wherein said at least one inlet air flow temperature sensor comprises a plurality of spaced-apart inlet air flow temperature sensors; and wherein said controller controls said evaporative water cooler based upon an average of the sensed drybulb temperatures.

13. A power generating apparatus according to claim 11 wherein said controller controls said evaporative water cooler to cool the inlet air flow to a temperature within a predetermined range of a saturation temperature of the inlet air flow.

14. A power generation apparatus according to claim 11 wherein said controller controls said evaporative water cooler to cool the inlet air flow to a temperature within a predetermined deadband.

15. A power generating apparatus according to claim 11 wherein said electrical generator has a base load rating; and wherein said controller starts said evaporative water cooler to cool the inlet air flow at a predetermined fraction of the base load.

16. A power generating apparatus according to claim 11 wherein said temperature measurement device comprises a resistance temperature detector.

17. A control assembly for a power generating apparatus comprising an electrical generator, a combustion turbine for driving the electrical generator, the combustion turbine having a combustion turbine air inlet for receiving an inlet air flow, and an evaporative water cooler for evaporating water into the inlet air flow to cool the inlet air flow, the control assembly comprising:
a plurality of inlet air flow temperature sensors to be positioned in spaced-apart relation between the evaporative water cooler and the combustion turbine air inlet, and each of said plurality of inlet air flow temperature sensors comprising
a hollow body connected in fluid communication with the inlet air flow, and
a temperature sensing device carried by said hollow body,
said hollow body comprising interior portions defining a tortuous path of air flow therethrough to reduce water accumulation on said temperature sensing device so that said temperature sensing device senses a drybulb temperature; and
a controller for controlling the evaporative water cooler based upon the sensed drybulb temperatures from said plurality of spaced-apart inlet air flow temperature sensors.

18. A control assembly according to claim 17 wherein said controller controls the evaporative water cooler based upon an average of the sensed drybulb temperatures.

19. A control assembly according to claim 17 wherein said controller controls the evaporative water cooler to cool the inlet air flow to a temperature within a predetermined range of a saturation temperature of the inlet air flow.

20. A control assembly according to claim 17 wherein said controller controls the evaporative water cooler to cool the inlet air flow to a temperature within a predetermined deadband.

21. A control assembly according to claim 17 wherein the electrical generator has a base load rating; and wherein said controller starts the evaporative water cooler to cool the inlet air flow at a predetermined fraction of the base load.

22. A control assembly according to claim 17 wherein the interior portions of said hollow body comprise a plurality of baffles in spaced apart relation.

23. A control assembly according to claim 22 wherein said plurality of baffles are arranged on alternating sides of opposing interior surface portions of said hollow body.

24. A control assembly according to claim 23 wherein said plurality of baffles extend inwardly from the opposing interior surface portions in an interdigitated fashion so that the tortuous path has a serpentine shape.

25. A control assembly according to claim 24 wherein said hollow body comprises a tube having an inlet at a first end and an outlet at a medial portion; and wherein said plurality of baffles are between the inlet and the outlet.

26. A method for controlling an evaporative water cooler for a combustion turbine for an electrical generator and having a combustion turbine air inlet, the method comprising:
positioning a plurality of inlet air flow temperature sensors in spaced-apart relation between the evaporative water cooler and the combustion turbine air inlet, each of the plurality of inlet air flow temperature sensors comprising a hollow body connected in fluid communication with the inlet air flow, and a temperature sensing device carried by the hollow body, the hollow body comprising inner portions defining a tortuous path of air flow therethrough to reduce water accumulation on the temperature sensing device so that the temperature sensing device senses a drybulb temperature; and
using the sensed drybulb temperatures from the plurality of spaced-apart inlet air flow temperature sensors for controlling the evaporative water cooler.

27. A method according to claim 26 further comprising using an average of the sensed drybulb temperatures for controlling the evaporative water cooler.

28. A method according to claim 26 further comprising controlling the evaporative water cooler to cool the inlet air flow to a temperature within a predetermined range of a saturation temperature of the inlet air flow.

29. A method according to claim 26 further comprising controlling the evaporative water cooler to cool the inlet air flow to a temperature within a predetermined deadband.

30. A method according to claim 26 wherein the electrical generator has a base load rating; and further comprising starting the evaporative water cooler to cool the inlet air flow at a predetermined fraction of the base load.

31. A control assembly for a power generating apparatus comprising an electrical generator, a combustion turbine for driving the electrical generator, the combustion turbine having a combustion turbine air inlet for receiving an inlet air flow, and an evaporative water cooler for evaporating water into the inlet air flow to cool the inlet air flow, the control assembly comprising:
    at least one inlet air flow temperature sensor to be positioned between the evaporative water cooler and the combustion turbine air inlet, and comprising
        a tubular hollow body connected in fluid communication with the inlet air flow to intercept a portion of the inlet air flow, and
        a temperature sensing device carried by said tubular hollow body,
        said tubular hollow body comprising interior portions defining a tortuous path of air flow therethrough to reduce water accumulation on said temperature sensing device so that said temperature sensing device senses a drybulb temperature; and
    a controller for controlling the evaporative water cooler based upon the sensed drybulb temperature.

32. A control assembly according to claim 31 wherein said at least one inlet air flow temperature sensor comprises a plurality of spaced-apart inlet air flow temperature sensors; and wherein said controller controls the evaporative water cooler based upon an average of the sensed drybulb temperatures.

33. A control assembly according to claim 31 wherein said controller controls the evaporative water cooler to cool the inlet air flow to a temperature within a predetermined range of a saturation temperature of the inlet air flow.

34. A control assembly according to claim 31 wherein said controller controls the evaporative water cooler to cool the inlet air flow to a temperature within a predetermined deadband.

35. A control assembly according to claim 31 wherein the electrical generator has a base load rating; and wherein said controller starts the evaporative water cooler to cool the inlet air flow at a predetermined fraction of the base load.

36. A control assembly according to claim 31 wherein the interior portions of said hollow body comprise a plurality of baffles in spaced apart relation.

37. A control assembly according to claim 36 wherein said plurality of baffles are arranged on alternating sides of opposing interior surface portions of said hollow body.

38. A control assembly according to claim 37 wherein said plurality of baffles extend inwardly from the opposing interior surface portions in an interdigitated fashion so that the tortuous path has a serpentine shape.

39. A control assembly according to claim 38 wherein said hollow body comprises a tube having an inlet at a first end and an outlet at a medial portion; and wherein said plurality of baffles are between the inlet and the outlet.

* * * * *